United States Patent [19]

Schmitt

[11] 4,200,987
[45] May 6, 1980

[54] GAUGE

[76] Inventor: Marvin G. Schmitt, 9475 Cormorant Cir., Fountain Valley, Calif. 92708

[21] Appl. No.: 949,746

[22] Filed: Oct. 10, 1978

[51] Int. Cl.² .......................... G01B 3/42; G01B 3/46; G01B 5/08
[52] U.S. Cl. .............................. 33/178 R; 33/149 R; 33/174 Q
[58] Field of Search ............. 33/178 R, 143 R, 148 R, 33/149 R, 169 C, 174 F, 174 Q, 147 K; 194/167

[56] References Cited

U.S. PATENT DOCUMENTS

| | | | |
|---|---|---|---|
| 1,810,710 | 6/1931 | Johansson | 33/178 R |
| 1,845,359 | 2/1932 | Stein | 33/178 R |
| 2,134,262 | 10/1938 | Phillips | 33/148 R |
| 2,377,679 | 6/1945 | Eckstein | 33/178 R |
| 2,472,139 | 6/1949 | Aldeborgh et al. | 33/178 R |
| 2,546,154 | 3/1951 | Gardner | 33/178 R |
| 2,577,262 | 12/1951 | Mueller et al. | 33/178 R |
| 2,714,256 | 8/1955 | Watson | 33/174 F |
| 2,733,516 | 2/1956 | Törnebohm | 33/178 R |
| 3,100,349 | 8/1963 | Stresau | 33/178 R |
| 3,267,580 | 8/1966 | Hohwart et al. | 33/178 R |

Primary Examiner—Willis Little
Attorney, Agent, or Firm—Pearne, Gordon, Sessions, McCoy & Granger

[57] ABSTRACT

A gauge for determining whether a hole is within tolerances is disclosed. Such gauge includes a cylindrical portion proportioned to fit within a hole with a relatively close fit. A paddle is pivotally mounted within the cylindrical portion for rotation in opposite directions from a neutral position. The paddle is formed so that when it is in the neutral position it has end faces which are aligned with the cylindrical portion of the gauge and which fit into the hole with a relatively close fit. One diagonal dimension of the paddle is equal to the minimum diameter of an in-tolerance hole and the other diagonal is equal to the maximum diameter of an in-tolerance hole. Once the gauge is positioned within the hole the paddle is tipped one way to determine if the hole has a diameter at least equal to the minimum diameter of an in-tolerance hole and the other way to determine if the hole has a diameter less than the maximum in-tolerance diameter. The gauge is manufactured by assembling the paddle within the cylindrical portion and grinding the paddle ends and the cylindrical portion to a predetermined diameter smaller than the diameter of the hole to be measured while holding the paddle in a predetermined angular relationship to a plane perpendicular to the axis of the cylindrical portion.

12 Claims, 5 Drawing Figures

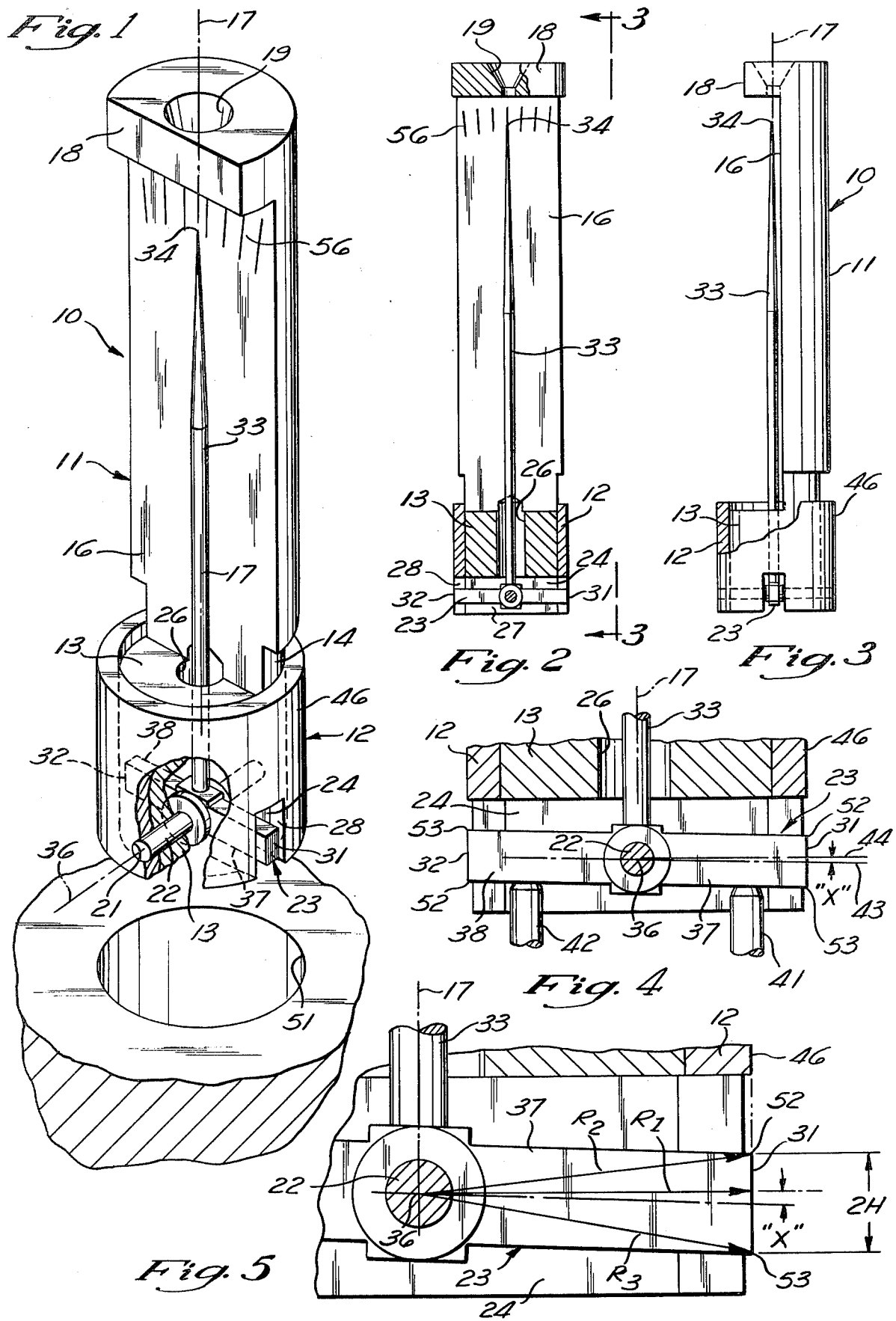

GAUGE

BACKGROUND OF THE INVENTION

This invention relates generally to gauging devices and more particularly to a novel and improved "hole" gauge and to a novel and improved method for manufacturing such gauge.

PRIOR ART

Various types of "go", "no-go" gauges are provided to measure hole sizes and determine if the hole is within specified tolerances. Some such gauges rely upon a tipping of the gauge in some manner after the gauge is inserted within the hole. Examples of gauges of such type are described in the U.S. Pat. Nos. 2,377,679; 2,472,139; 2,546,154; 2,577,262; 2,733,516; 3,100,349 and 3,267,580.

SUMMARY OF THE INVENTION

A gauge in accordance with the present invention as structured for ease of manufacture and use. It employs a paddle pivoted on a support which provides a cylindrical surface sized to closely fit, with sufficient clearance to insure easy insertion, into a hole to be measured. The paddle is held in a mid-position during insertion and in such mid position provides ends which are aligned with a cylindrical surface. Therefore, in such mid position the paddle is also provided with sufficient clearance to permit easy insertion.

The paddle is formed so that one of its diagonals has a dimension equal to the minimum diameter of an in-tolerance hole and its other diagonal has a dimension equal to the maximum diameter of an in-tolerance hole. The gauge is provided with a lever which operates to pivot the paddle to sequentially position the paddle diagonals perpendicular to the axis of the gauge and in turn the axis of the hole.

If the hole is within tolerance the paddle freely moves past a position in which the first diagonal is perpendicular to the hole axis but when the paddle is moved to a position in which the second paddle diagonal approaches a position perpendicular to the axis of the hole interference is developed and noted by the gauge user. Therefore, the gauge user easily determines if the hole diameter is within tolerance by determining that the hole diameter is greater than the minimum tolerance diameter and less than the maximum tolerance diameter. With such gauge hole size is quickly and easily determined.

The gauge is manufactured by assembling the gauge parts and then simultaneously grinding the cylindrical surface of the support and the ends of the paddle while the paddle is held in a predetermined mid position. The diameter to which the cylindrical surface and the paddle ends are ground is selected to provide the desired clearance with the hole size to be measured. Such predetermined mid position and the height of the paddle ends are selected so that this single grinding operation produces a paddle having one diagonal equal to the minimum diameter to be measured and the other diagonal equal to the maximum diameter to be measured.

BRIEF DESCRIPTION OF THE DRAWINGS

FIG. 1 is a perspective view of an assembled gauge incorporating the present invention;

FIG. 2 is a side elevation of the assembled gauge;

FIG. 3 is a side elevation taken along 3—3 of FIG. 2;

FIG. 4 is an enlarged fragmentary section of the gauge illustrating the paddle in the mid position in which the grinding of the paddle and the cylindrical surface are simultaneously performed; and FIG. 5 is an enlarged fragmentary view of the paddle illustrating the various dimensions used to establish the geometry of the gauge.

DETAILED DESCRIPTION OF THE DRAWINGS

A preferred embodiment of a gauge in accordance with the present invention includes only five parts. The support assembly 10 consists of a body member 11 and a ring member 12. The body member 11 may be formed of a piece of cylindrical stock having a lower cylindrical end portion 13 providing a cylindrical outer surface 14 sized to fit into the ring member 12 with a press fit for permanent assembly of the two parts. Above the cylindrical end portion 13 the body member is milled off to provide an axially extending face 16 spaced back from the central axis 17 and parallel to such axis. At the upper end of the body member a forwardly extending shoulder 18 is provided which extends forwardly from the face 16 past the central axis 17 so that a turning center 19 can be provided on the axis 17.

The lower end of the body member 11 is formed with a cross bore 21 which receives a pivot pin 22 for pivotally supporting a paddle 23 within a lateral groove 24 extending across the cylindrical portion 13 of the body member 11. The axis of the pivot pin is perpendicular to and intersects the central axis 17. An axial bore 26 extends from the face 16 along the cylindrical end portion 13 and is open to the lateral groove 24. A second turning center 27 is provided on the axis 17 at the lower end of the body member 11. Such turning center has sufficiently large diameter to bridge the lateral groove 24.

The diameter of the cylindrical end portion 13 is reduced from the diameter of the remaining portions of the body member 11 and as mentioned above is sized for a press fit into the ring member 12. The outer diameter of the ring member 12 is greater than the maximum diameter of the body member 11 so that when the gauge is inserted in a hole to be measured, the body member does not contact the wall of the hole to be measured.

The ring member, like the body member, is formed with a lateral groove 28 which is aligned with the lateral groove 24 in the body member 11 and the ends 31 and 32 of the paddle project along the two lateral grooves 24 and 28 to a location aligned with the exterior of the ring member 12 in the manner described in more detail below.

Projecting upwardly from the paddle 23 is a lever or indicator 33 which extends up through the axial bore 26 and along the face 16 to an upper end at 34. The lower end of the lever indicator 33 is positioned in a bore in the paddle 23 so that the pivotal position of the paddle around the pivot axis 36 is determined by the lever indicator 33.

Referring now to FIGS. 4 and 5 the paddle is symmetrical about the pivot axis 36 of the pivot pin 22 and provides oppositely extending arms or extensions 37 and 38 which extend to the ends 31 and 32 respectively. The two arms 37 and 38 are formed with equal width determined in a manner discussed below.

In the manufacture of the gauge the various parts are assembled and the paddle 23 is positioned by micrometer pins 41 and 42 so that the longitudinal center line 43 of the paddle 23 is displaced from a plane 44 perpendicular to the central axis 17 and containing the axis 36 by an angle "X". The angle "X" is determined in the manner discussed below for a particular gauge.

While the paddle is held in such position the entire gauge is placed in a grinding machine and the ring member 12 is ground to provide an outer cylindrical surface 46 having a radius less than the radius of the hole to be measured by a predetermined amount of clearance so that the cylindrical surface 46 will fit easily into the hole to be measured. At the same time the ends 31 and 32 of the paddle are ground to exactly the same radius while the paddle is held by the micrometer pins 41 and 42 at an angle "X" mentioned above. The parts are assembled so that during the grinding operation the operator indicator extends substantially along the axis 17 and is in the mid position as is best illustrated in FIGS. 1 and 2.

The angle "X" and the height or width of the paddle are selected so that one diagonal of the paddle has a dimension equal to the minimum diameter of a hole 51 to be measured by the gauge and the other diagonal has a dimension equal to the maximum diameter of the hole 51 to be measured by the gauge. The difference between the two diagonals is equal to the tolerance specified for the hole diameter.

Referring to FIG. 5, $R_1$ is equal to the radius of the cylinder surface 46 and also the radius of the paddle arm 37 when the paddle arm is in the mid position. $R_2$ is equal to one-half of the first diagonal or equal to the minimum radius of an in-tolerance hole. $R_3$ is equal to one-half the second diagonal or the radius of a maximum in-tolerance hole. 2H is equal to the width of the paddle at its ends. It should be understood that in FIG. 5 only one arm is illustrated but that the two arms are symmetrical with respect to the axis 36.

Before manufacturing the gauge, the minimum and maximum diameters of the hole size to be measured are determined. It is also established how much clearance is desired to allow easy insertion of the gauge into the hole. These dimensions determine the width of the paddle arms 37 and 38 as indicated by the dimension 2H in FIG. 5. Once assembled the paddle is positioned with an angle "X". Again, the value of the angle "X" is determined by the various dimensions. The following formulas are used to determine the angle "X" and the dimension 2H for any particular gauge.

$$2H = \sqrt{R_3^2 - R_1^2} + \sqrt{R_2^2 - R_1^2}$$

$$\tan X = \frac{\sqrt{R_3^2 - R_1^2} - \sqrt{R_2^2 - R_1^2}}{2R_1}$$

It is recognized that the dimension 2H is measured parallel to the central axis and not perpendicular to the length of the respective arms. However, since the angle "X" is small this difference can be disregarded in most cases. If, for example, the gauge is intended to measure a hole having a diameter of one inch ±0.003 inches such hole has a minimum diameter of 0.997 inches and a maximum diameter of 1.003 inches. The gauge is to be manufactured with a cylindrical surface 46 having a diameter of 0.994 inches to provide a clearance of 0.003 inches with a minimum in-tolerance hole diameter for easy insertion of the gauge into the hole. $R_1$ equals one half of 0.994 or 0.497. $R_2$ is equal to one half of 0.997 or 0.4985 inches. $R_3$ is equal to one half of 1.003 inches or 0.5015 inches.

Solving the above formulas it is determined that 2H is equal to 0.1057 inches and the angle "X" is equal to 1.636°. After the manufacture as described above, the paddle has diagonals equal to 0.997 inches and 1.003 inches respectively. However, while the paddle is held in the mid position, its end faces provide a lateral dimension along a plane perpendicular to the axis 17 of 0.994 inches. Therefore, the gauge can be easily inserted into a hole 51 having an in-tolerance dimension between 0.997 inches and 1.003 inches.

After insertion which occurs while the operator lever 33 is held in the mid position, the gauge user then moves the operator indicator 33 to the right as viewed in the FIGS. 1 and 2 to cause pivotal movement of the paddle 23 until the first diagonal is aligned with the plane 44. If the opposite corners 52 at the ends of the first diagonal do not engage the wall of the hole 51, it is determined that the diameter of the hole 51 is greater than 0.997 inches. On the other hand, if interference is developed between the corners 52 and the walls of the hole, the operator knows that the hole is below the minimum tolerance. The user then moves the operator lever 33 to the left causing anti-clockwise rotation of the paddle 23 to move the corners 53 toward a position in alignment with the plane 44. If the hole being measured has a diameter less than 1.003 inches, engagement will occur between the corners 53 and the wall of the hole 51 which is determined by "feel" through the operator lever 33. If the hole is in-tolerance, engagement should occur between the corners 53 and the wall of the hole. If such engagement does not occur, it is determined that the diameter of the hole is outside of the tolerance range and is too big.

In use the operator merely positions the gauge within the hole and pulls the lever 33 back and forth to measure the hole and quickly determine if it is in-tolerance or if not within tolerance whether the hole is above or below tolerance. Because the cylindrical wall 46 closely fits the hole the paddle is automatically held along a diameter of the hole and inaccuracies do not result from improper positioning of the paddle within the hole. Also, because the diameter of the cylindrical surface 46 is slightly smaller than the diameter of the hole being measured and because the end surfaces 31 and 32 are formed with the same radius of curvature as the cylindrical surface 46, contact is developed between the corners 52 and 53 and the surface of the hole being measured which approaches a point contact even though the paddle has a substantial width in the direction of the plane 44.

If desired the face 16 can be provided with indicia 56 adjacent to the upper end 34 of the operator indicator that is located so that an actual measurement of the hole diameter can be established if the corners 52 or 53 engage the hole. In such instance, for example, the user of the gauge can determine the actual dimension of the hole when it is below the minimum in-tolerance dimension by noting the lever position when the corners 52 engage the hole surface. Similarly, the actual dimension of the hole is determined by the position of the operator lever when the corners 53 engage the hole surface.

Preferably the operator lever 33 is relatively flexible so that in use it bends and prevents the accidental jamming of the paddle in the hole. This flexibility reduces the likelihood that the gauge will be damaged in use.

Although a preferred embodiment of this invention is illustrated it is to be understood that various modifications and rearrangements may be resorted to without departing from the scope of the invention disclosed and claimed.

I claim:

1. A gauge comprising a support providing a cylindrical surface having a first axis, said cylindrical surface having a first diameter a sufficient amount smaller than the diameter of hole to be measured to permit easy insertion of said cylindrical surface into said hole, a paddle journaled on said support for pivotal movement about a second axis substantially perpendicular to said first axis and providing oppositely extending extensions, each extension providing an end face aligned with said cylindrical surface when said paddle is in a first position, said paddle providing a first diagonal having a length equal to the minimum diameter of a hole to be measured and a second diagonal equal to the maximum diameter of a hole to be measured, and operator means operable to pivot said paddle around said second axis while said paddle and cylindrical surface are in a hole to be measured from said first position toward a second position in which said first diagonal is perpendicular to said first axis and toward a third position in which said second diagonal is perpendicular to said first axis.

2. A gauge as set forth in claim 1 wherein said support includes a body member, and a ring member mounted on said body member, and said ring member provides said cylindrical surface.

3. A gauge as set forth in claim 2 wherein a pivot on said body member within said ring supports said paddle for said pivotal movement.

4. A gauge as set forth in claim 3 wherein said end face of each extension is produced by simultaneously grinding said cylindrical surface and the ends of said extensions to said first diameter while said paddle is held in said first position.

5. A gauge as set forth in claim 3 wherein said body member is provided with a face spaced from said first axis and substantially parallel thereto, and said operator means includes an elongated operator mounted on said paddle and extending parallel to said face.

6. A gauge as set forth in claim 3 wherein said operating means includes an elongated operator mounted on said paddle and extending substantially along said first axis when said paddle is in said first position.

7. A gauge as set forth in claim 6 wherein said operator is flexible to resist jamming of said paddle in a hole being measured.

8. A gauge as set forth in claim 1 wherein said end face of each extension is produced by simultaneously grinding said cylindrical surface and the ends of said extensions to said first diameter while said paddle is held in a first position.

9. A gauge as set forth in claim 1 wherein said operator means includes a flexible elongated operator mounted on said paddle and extending substantially along said first axis when said paddle is in said first position, said operator being sufficiently flexible to normally prevent said paddle from becoming jammed in a hole being measured.

10. A gauge as set forth in claim 9 wherein said support is provided with a face along which said operator moves, and indicia is provided on said face to indicate the dimension of a hole when said paddle engages the wall of such hole.

11. A method of manufacturing gauges for measuring a diameter of holes comprising assembling a paddle within a cylindrical portion of a support with said paddle mounted for pivotal movement about an axis perpendicular to and intersecting the axis of said cylindrical portion, providing said paddle with opposite extensions having ends substantially flush with the surface of said cylindrical portion, and while holding said paddle at a predetermined mid-position having a predetermined angle with respect to a plane perpendicular to the axis of said cylindrical portion simultaneously grinding said cylindrical portion and said ends of said paddle to a predetermined diameter smaller than the minimum diameter of a hole to be measured, the height of said ends of said paddle and said angle being selected so that said grinding produces a first paddle diagonal equal to the minimum diameter of a hole to be measured and a second paddle diagonal equal to the maximum diameter of a hole to be measured.

12. A method of manufacturing gauges as set forth in claim 11 wherein said height of said paddle ends is substantially equal to $\sqrt{R_3^2 - R_1^2} + \sqrt{R_2^2 + R_1^2}$ and the tangent of said angle is substantially equal to $$\frac{\sqrt{R_3^2 - R_1^2} - \sqrt{R_2^2 - R_1^2}}{2R_1}$$

wherein; $R_1$ is equal to one-half said predetermined diameter; $R_2$ is equal to one-half said first diagonal; and $R_3$ is equal to one-half said second diagonal.

* * * * *